Figure 1:
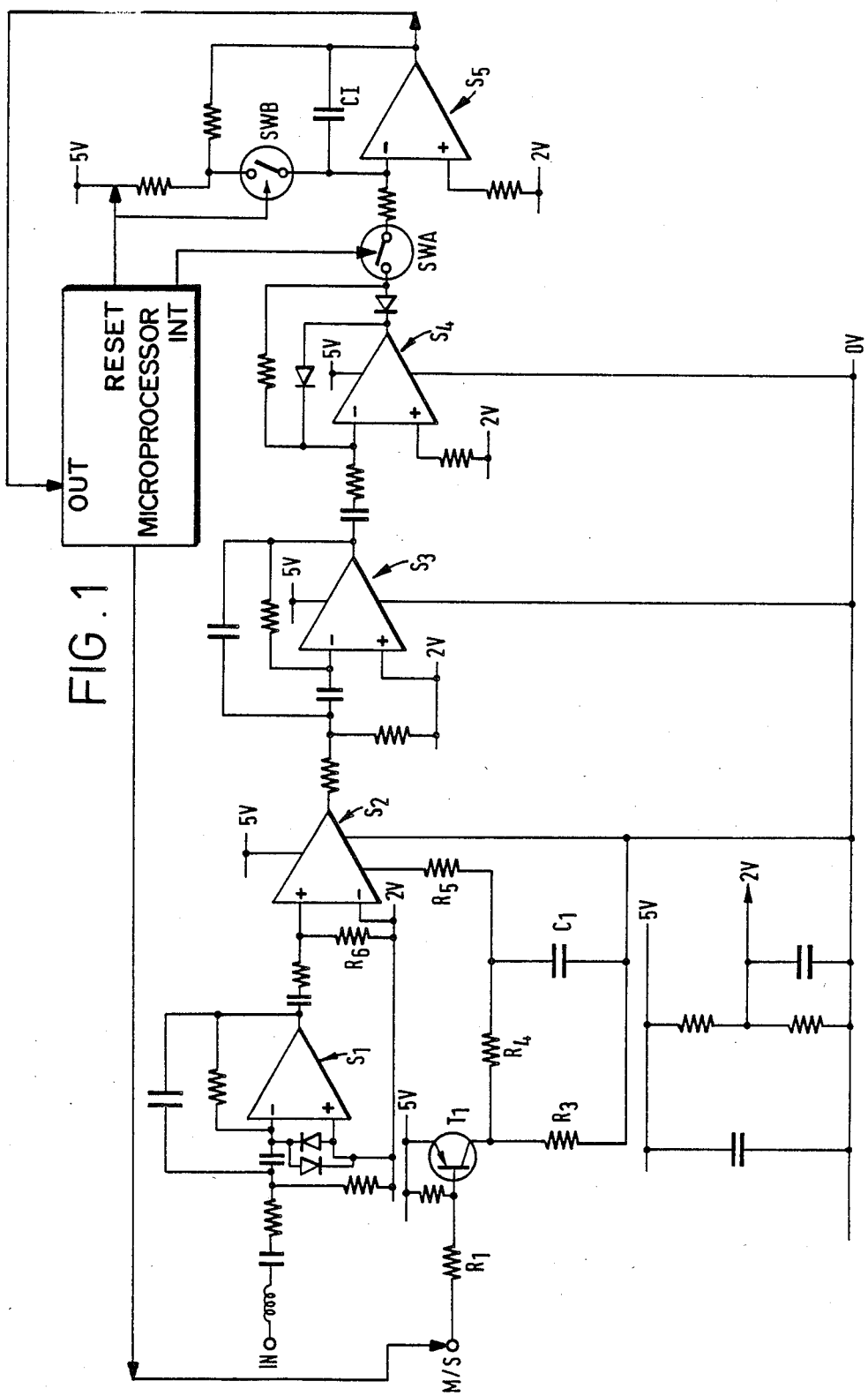

United States Patent [19]

Cockerham et al.

[11] Patent Number: 4,887,456
[45] Date of Patent: Dec. 19, 1989

[54] KNOCK DETECTION SYSTEM

[75] Inventors: Kevin Cockerham, Sutton Coldfield; Simon W. Packwood, Birmingham, both of England

[73] Assignee: Lucas Industries plc, Birmingham, England

[21] Appl. No.: 124,607

[22] Filed: Nov. 24, 1987

[30] Foreign Application Priority Data

Nov. 27, 1986 [GB] United Kingdom ............... 8628338

[51] Int. Cl.$^4$ ............................................ G01L 23/22
[52] U.S. Cl. ......................................................... 73/35
[58] Field of Search ........................... 73/35; 123/425; 364/431.08

[56] References Cited

U.S. PATENT DOCUMENTS

| | | | |
|---|---|---|---|
| 4,312,214 | 1/1982 | Kramer et al. | 73/35 |
| 4,463,722 | 8/1984 | Kobayashi | 123/425 |
| 4,491,010 | 1/1985 | Brandt et al. | 73/35 |
| 4,593,553 | 6/1986 | Bonitz et al. | 73/35 |
| 4,644,918 | 2/1987 | McDermott | 73/35 |

*Primary Examiner*—John Chapman
*Attorney, Agent, or Firm*—Nixon & Vanderhye

[57] ABSTRACT

A knock detection system for an internal combustion engine comprises an input for receiving a signal from a vibration-sensing transducer, an amplifier to which the input is connected and a rectifying and integrating device connected to the output of the amplifier, the amplifier comprising a variable gain amplifier and feedback device being provided for controlling the gain of the variable gain amplifier in dependence upon variations in the output level of the rectifying and integrating device. The gain control which is exercised tends to maintain the integrator output level within an optimum band so as to overcome problems due to input offset voltage errors.

8 Claims, 2 Drawing Sheets

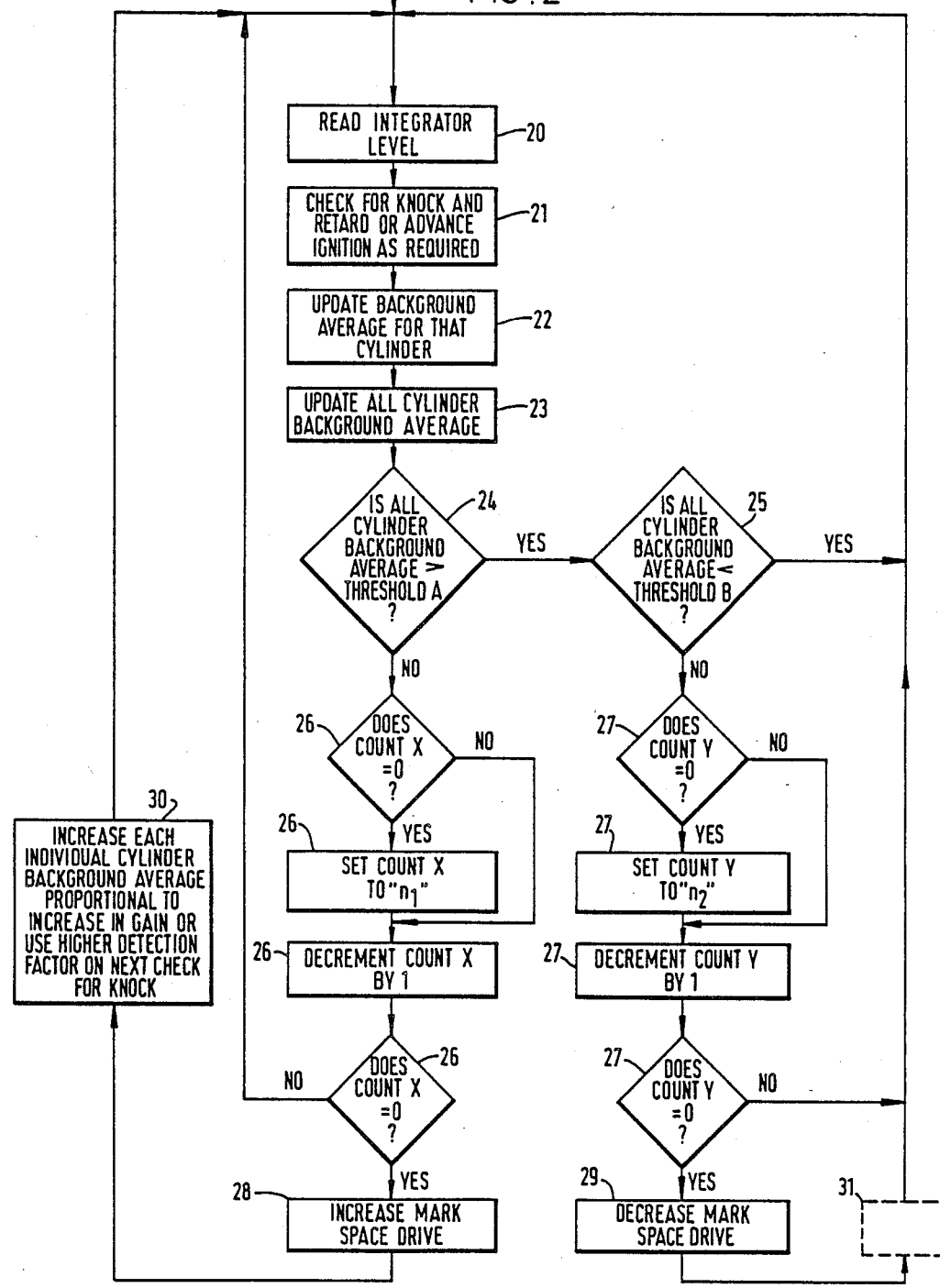

KNOCK DETECTION SYSTEM

This invention relates to a knock detection system for an internal combustion engine.

It is known to provide an internal combustion engine with a system for detecting the effect known as knock and for adjusting the ignition timing accordingly so as to terminate the knock condition. A known knock detection system comprises a piezoelectric or other vibration-sensing transducer mounted to the engine and serving to convert engine vibrations into an electric signal. This signal is amplified, rectified and then integrated in order to provide an output representing the level of vibration, from which a determination is made as to whether a knock condition is prevailing. hitherto, such knock detection systems have suffered from the problem that the input off-set voltages of the operational amplifiers used in the system produce significant errors. These are a particular problem at low engine speeds where integration errors are large.

We have now devised a knock detection system in which the problem due to input offset voltage errors is overcome.

In accordance with this invention, there is provided a knock detection system for an internal combustion engine, comprising an input for receiving a signal from a vibration-sensing transducer, an amplifier to which said input is connected, and a rectifying and integrating circuit connected to the output of said amplifier, said amplifier comprising a variable gain amplifier and feedback means being provided for controlling the gain of the amplifier in dependence upon variations in the output level of the rectifying and integrating circuit.

Preferably the gain of the amplifier is controlled in dependence upon an average of the output level over a period of time. In a preferred embodiment of knock detection system, an average is made of the output level prevailing in the absence of a knock condition (a background average). A microprocessor serves to hold and update a background average for each cylinder of the engine, and also from this a background average for all cylinders. Then if the background average for all cylinders rises above an upper threshold or falls below a lower threshold, then the gain of the amplifier is reduced or increased accordingly.

In the preferred embodiment the variable gain amplifier comprises a transconductance amplifier with its gain control effected by way of its bias current. The microprocessor may provide a train of pulses having a variable mark/space ratio for determining the amplifier gain, which pulse train is applied to a digital-to-analogue converter for controlling the amplifier bias current. This digital-to-analogue converter may comprise a simple low-pass filter.

A single microprocessor may control the variable gain amplifier as described above and also control the integrating function in accordance with known principles. Thus, in this case the microprocessor controls the integrating circuit in order to provide an output proportional to the knock signal level over a predetermined period for each cylinder, and further controls resetting of the integrating capacitor.

An embodiment of this invention will now be described by way of example only and with reference to the accompanying drawings, in which:

FIG. 1 is a circuit diagram of a knock detection system in accordance with the invention; and FIG. 2 is a flow diagram of the gain control subroutine of a microprocessor incorporated in the knock detection system.

Referring to FIG. 1 of the drawings, there is shown a knock detection system for an internal combustion engine of a vehicle. The system comprises a signal input IN which is connected to a piezoelectric or other vibration-sensing transducer mounted to the engine. The signal input IN is connected to the first stage $S_1$ of the system, which is an active band-pass filter having its pass band centered around the fundamental frequency of the knock vibration. The band-pass filter stage $S_1$ feeds a second stage $S_2$ which comprises a variable gain amplifier, which will be described in more detail below. The third stage $S_3$ is another active band-pass filter with its pass-band centered around the knock frequency, but also provides the required gain for the overall circuit. The fourth stage $S_4$ comprises a precision half-wave rectifier and feeds an integrator fifth stage $S_5$ via an electronic switch SWA. The integrator provides an output OUT which is read by a microprocessor of the system via an analogue-to-digital converter. A second electronic switch SWB is connected in series with a resistor across the integrating capacitor CI: the microprocessor controls the switches SWA and SWB over lines INT and RESET, closing switch SWA for each integration process and closing switch SWB afterwards to reset the capacitor. The integration period comprises a predetermined angular window for each cylinder, but may instead comprise a fixed time period for each cylinder.

The variable gain amplifier stage $S_2$ comprises a transconductance amplifier having a linear gain control effected by way of its bias current. In the example shown, a pulse train of variable mark/space ratio, controlled by the microprocessor, is applied to a terminal M/S and thence via a series resistor $R_1$ to the base of a transistor $T_1$. The emitter of transistor $T_1$ is connected to a +5 V rail and its collector is connected to ground via a resistor $R_3$. A resistor $R_4$ and a capacitor $C_1$ are connected across resistor $R_3$ and the junction of $R_4$, $C_1$ is connected to a resistor $R_5$ through which the bias current for the amplifier $S_2$ is delivered. The arrangement therefore forms a low-pass filter acting as a digital-to-analogue converter for responding to the variable mark/space ratio of the signal applied to terminal M/S from the microprocessor, in order to control the bias current and therefore the gain of the amplifier $S_2$. It will also be noted that the input to the stage $S_2$ is potted down by a resistor $R_6$ in order to avoid undesired output compression in view of the input limitations of the transconductance amplifier.

The microprocessor seeks to maintain the integrator output level in an optimum band between lower and upper thresholds A, B, by controlling the gain of the system using feedback from the integrator output. However, the response of the system is not so fast that it might mask the changes in integrator level due to knock. An average of the integrator output level found in the absence of knocking (i.e. a background average) may be used as the criterion governing the gain of stage $S_2$, and an example of this form of control will now be described with reference to FIG. 2.

FIG. 2 shows a flow diagram of the sub-routine of the microprocessor for controlling the gain of the amplifier stage $S_2$. In this sub-routine, at step 20 the microprocessor reads the integrator output level, at the end of an integrating period controlled by the microprocessor through switch SWA in FIG. 1 and before resetting the integrating capacitor CI through switch SWB. At step 21 the microprocessor compares the integrator output level which it has just read against a knock reference in order to determine whether the respective cylinder is exhibiting knock: if a knocking condition is detected, then the microprocessor retards the ignition timing to terminate the knocking, whilst if there is no knocking the microprocessor advances the ignition timing. At step 22 the microprocessor updates a background average of the integrator output level for the particular cylinder concerned. The microprocessor holds background averages for the respective cylinders and at step 23 it updates the background average for all cylinders. Step 24 determines if the all-cylinder background average is greater than the lower threshold A: if it is, step 25 determines if the all-cylinder average is also lower than the upper threshold B. Thus if the all-cylinder background average lies between the thresholds A and B, the sub-routine of FIG. 2 is carried out again without any change to the gain of stage $S_2$.

Suppose however either step 24 or 25 determines that the all-cylinder background average of the integrator output level is outside the band defined by thresholds A and B. Then a timing facility at 26 or 27 imparts a delay (effectively requiring the all-cylinder average to lie outside the band for a number $n_1$ or $n_2$ of successive readings) before the mark/space ratio of the driving pulse train provided by the microprocessor is either increased or decreased at 28 or 29, to increase or decrease the gain of the amplifier stage $S_2$.

If the all-cylinder background average has fallen below the lower threshold A such that the amplifier gain is increased at step 28, then step 30 serves to proportionally increase each individual-cylinder average (and hence the all-cylinders average) or to increase the detection factor, so as to increase for each respective cylinder the knock reference against which the integrator output level is compared in order to check for a knocking condition. A corresponding step 31 may be provided (for decreasing each cylinder average or decreasing detection factor if step 29 is invoked for decreasing the amplifier gain.

The knock detection system which has been described accordingly overcomes the problem due to input offset voltage errors by exercising a gain control tending to maintain the integrator output level within an optimum band.

What is claimed is:

1. In an internal combustion engine, a knock-detection system comprising:
   an input for receiving a signal from a vibration-sensing transducer;
   a variable gain amplifying means to which said input is connected;
   a rectifying and integrating means, responsive to the output of said amplifying means, for providing an integrated output;
   means for comparing said integrated output to a knock reference for knock determination; and
   feedback means for controlling the gain of said variable gain amplifying means in dependence upon variations in said integrated output level of said rectifying and integrating means and for adjusting said knock reference as a function of said variations.

2. A knock detection system as claimed in claim 1, in which said feedback means comprises control means to determine an average of said output level of the rectifying and integrating means over a period of time and to control the gain of said variable gain amplifier in dependence upon said average.

3. A knock detection system as claimed in claim 2, wherein a knock condition exists when said integrated output level exceeds said knock reference and an absence of a knock condition exists when said integrated output level does not exceed said knock reference, in which said control means determines a background average comprising an average of said output level prevailing in the absence of a knock condition to control the gain of said variable gain amplifier in dependence upon said background average.

4. A knock detection system as claimed in claim 3, in which said control means determines when said background average rises above an upper threshold and when it falls below a lower threshold, in order respectively to reduce and increase the gain of said variable gain amplifier.

5. A knock detection system as claimed in claim 4, in which said control means determines successive readings of said background average and alters the gain of said variable gain amplifier only after a predetermined number of successive readings of the background average are respectively above and below the respective threshold.

6. A knock detection system as claimed in claim 1, in which said variable gain amplifier comprises a transconductance amplifier having means providing a bias current thereto, said feedback means controlling the bias current providing means in order to control the gain of said amplifier.

7. A knock detection system for an internal combustion engine, comprising:
   an input for receiving a signal from a vibration-sensing transducer;
   an amplifying means to which said input is connected; and
   rectifying and integrating means connected to the output of said amplifying means, said amplifying means comprising a variable gain amplifier provided with feedback means for controlling the gain of the variable gain amplifier in dependence upon variations in the output level of the rectifying and integrating means, in which said feedback means comprises means to provide a train of pulses of variable mark/space ratio for determining the amplifier gain, and a digital-to-analogue converter receiving said pulse train and having an output connected to the amplifier to control its gain.

8. A knock detection system for an internal combustion engine, comprising:
   an input for receiving a signal from a vibration-sensing transducer;
   a variable gain amplifying means, responsive to said input, having a variable gain and an output;
   a rectifying and integrating means, connected to said amplifying means output, including an integrating capacitor, said capacitor having an integrated output; and
   control means for repeatedly permitting and rectifying and integrating means to integrate said output from said amplifying means for a predetermined period and for subsequently resetting said integrating capacitor, said control means including:
   means for measuring said integrated output at the end of each predetermined period, for providing a measured output at the end of each predetermined period, and for comparing said measured output with a knock;

means for determining and for storing an average of measured outputs when said outputs are below said knock;

means for determining when said average is above an upper threshold and below a lower threshold, and for decreasing and increasing, respectively, the variable gain of said variable gain amplifying means; and means for modifying said knock as a function of said variable gain.

* * * * *